United States Patent

Hobrough

[15] 3,651,416

[45] Mar. 21, 1972

[54] DIGITAL PARALLAX DISCRIMINATOR SYSTEM

[72] Inventor: Gilbert L. Hobrough, Vancouver, British Columbia, Canada

[73] Assignee: Hobrough Limited, Vancouver, British Columbia, Canada

[22] Filed: May 23, 1969

[21] Appl. No.: 827,428

[52] U.S. Cl. ............328/133, 324/83 D, 328/109, 328/155

[51] Int. Cl. ............H03d 13/00

[58] Field of Search ............328/109, 133, 134, 155; 307/232, 295; 324/83 D, 83 Q

[56] References Cited

UNITED STATES PATENTS

| | | | |
|---|---|---|---|
| 2,858,425 | 10/1958 | Gordon | 328/134 |
| 3,245,079 | 4/1966 | Stover | 328/133 X |
| 3,328,688 | 6/1967 | Brooks | 328/133 X |
| 3,512,085 | 5/1970 | Peterson et al. | 324/83 D |

*Primary Examiner*—Stanley T. Krawczewicz
*Attorney*—Christensen, Danborn & Matthews

[57] ABSTRACT

This specification discloses a system which operates on a pair of video signals using digital circuitry for determining the phase relationship between the two signals. The system is particularly adapted for determining the parallax between the left and right video signals in an orthophoto printer system of the type disclosed in my copending application Ser. No. 760,435, filed Sept. 18, 1968. The left and right video input signals derived from the stereophotograph scanning devices in that application are applied to novel frequency band-selection and video-to-digital converter circuits which operate to provide binary signals corresponding to selected frequency bands of the input signals. The output signals from the converter circuits are applied to a plurality of novel parallax discriminators connected in parallel circuit arrangement so that a multi-bit binary representation of the parallax existing between the pair of video input signals is obtained. Details of the overall system as well as of the video-to-digital converters and the digital parallax discriminators are provided.

11 Claims, 9 Drawing Figures

INVENTOR
GILBERT L. HOBROUGH
BY Christensen Sanborn & Matthews
ATTORNEYS

INVENTOR
GILBERT L. HOBROUGH
BY Christensen Sanborn & Matthews
ATTORNEYS

INVENTOR
GILBERT L. HOBROUGH
BY Christensen Sanborn & Matthews

ATTORNEYS

INVENTOR:
GILBERT L. HOBROUGH
BY Christensen Sanborn & Matthews
ATTORNEYS

INVENTOR
GILBERT L. HOBROUGH
BY
Christensen Sanborn & Matthews
ATTORNEYS

DIGITAL PARALLAX DISCRIMINATOR SYSTEM

As discussed in the above referred to copending application, a need exists for accurate signal correlators for determining parallax existing between a pair of video signals (referred to as left and right video signals when used in the context of stereophoto signal correlation). While various systems and techniques are presently available for determining parallax it would be advantageous to have a system operating on the basis of digital circuitry. It is therefore an object of the present invention to provide an improved signal correlation system adapted for use in determining parallax between a pair of video signals.

Another object of the present invention is to provide an improved video-to-digital signal converter.

Another object of the present invention is to provide an improved parallax discrimination system utilizing a plurality of individual parallax discriminator circuits and video-to-digital converter circuits in parallel circuit arrangement for providing in binary notation an output signal representing the magnitude and sense of parallax between a pair of high frequency input signals.

In accordance with the teachings of the present invention left and right video input signals are applied to a plurality of frequency band-selection and video-to-digital converter circuits operating in parallel circuit arrangement to provide a plurality of output signals representing in binary notation the direction and extent of change occurring in selected bands of each of the input signals. Each selection and conversion circuit includes a low pass filter connected in series with a high speed signal sampling circuit.

The output signals from the frequency selection and converter circuits are applied in parallel to a plurality of digital parallax discriminator circuits which operate to multiply delayed and undelayed signals from the various bands of the left and right channels. In one embodiment of the invention an up-down counter coupled to the multiplication circuitry serves to average the output signals over a selected time interval. The sampling and averaging time for each of the bands is different and therefore the output signals from the parallax discriminators are disclosed as being applied to a time delay equalizer prior to application of the parallel binary signal to a parallel-to-serial converter. The output signals from the parallel-to-serial converter are then applied to a lateral integrator, a Gestalt accumulator, a serial buffer unit, and finally to a digital-to-analog converter for application to the deflection control circuitry of one of the photoscanning devices for reduction of the parallax.

The above as well as additional advantages and objects of the invention will be more clearly understood from the following description when read with reference to the accompanying drawings.

Figure 1:
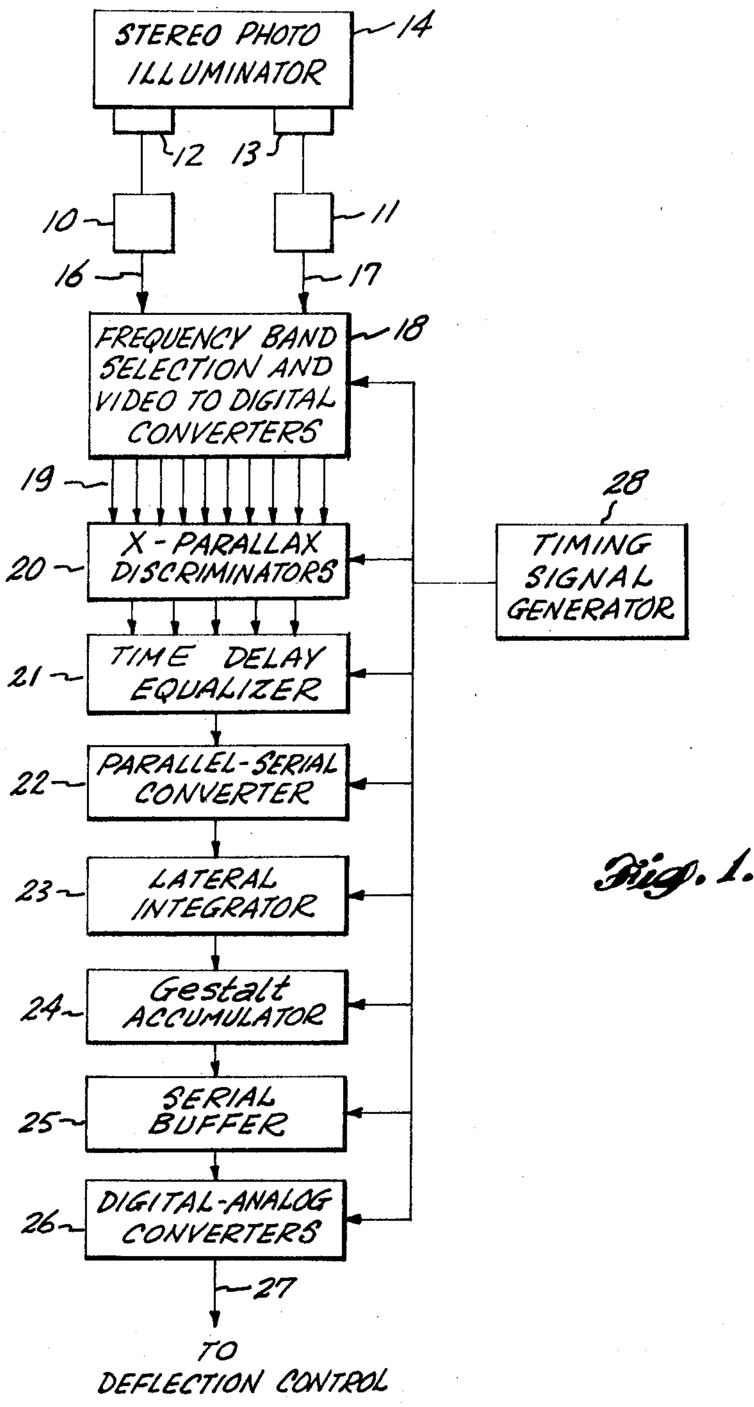
FIG. 1 is a generalized block diagram of a preferred embodiment of the overall system which is adapted to receive left and right video input signals, operate on the same using digital techniques, and then provide deflection control output signals for reducing the parallax between the left and right input video signals.

Turning now to the drawings and in particular to FIG. 1 the overall system concepts will be described. As disclosed in the previously mentioned copending application, the system of the present invention finds particular use in the video parallax discriminator art wherein left and right video signals are provided by the TV scanning cameras 10 and 11 which are focused on the photographs 12 and 13 making up a stereo pair. A conventional stereo photo illuminator 14 holds the photographs 12 and 13 for scanning by the cameras 10 and 11. The cameras 10 and 11 provide the left and right video output signals on their output circuits 16 and 17. Each of the video signals is effectively broken into a plurality of frequency bands, with each band then being periodically sampled and converted to a binary value by the band-selection and video-to-digital converter circuits shown generally at 18. As disclosed in greater detail in FIG. 3, the pairs of output signals representing the condition of the left and right signals in a given band are provided via the output circuits 19 to the parallax discriminator circuits 20. The parallax discriminator circuits 20 are connected in parallel circuit arrangement (as described hereinafter with respect to FIG. 2) in an arrangement such that a plurality of output signals in binary notation are provided to the time delay equalizer 21. This circuit compensates for the fact that the video-to-digital converter circuits and the parallax discriminator circuits introduce different signal delays since each is operating upon an input signal within a different frequency band.

Once the direction and magnitude of the parallax has been determined the system makes use of a lateral signal integrator which receives the binary parallax information in serial format. Thus the parallel to serial signal converter 22 is connected between the parallax discriminator circuitry and the lateral signal integrator 23. Output signals from the integrator 23 are applied to a Gestalt accumulator 24 such as disclosed in the referred to copending application. Output signals from the Gestalt accumulator are applied to the serial buffer 25, then converted to analog form by the digital-to-analog converter 26 and an analog deflection control signal for one of the cameras 10 or 11 is provided on the output circuit 27.

A timing signal generator 28 is coupled with the various units in the system of FIG. 1 and as described hereinafter serves to provide a plurality of differently spaced timing signals (also referred to as clock signals).

Figure 2:
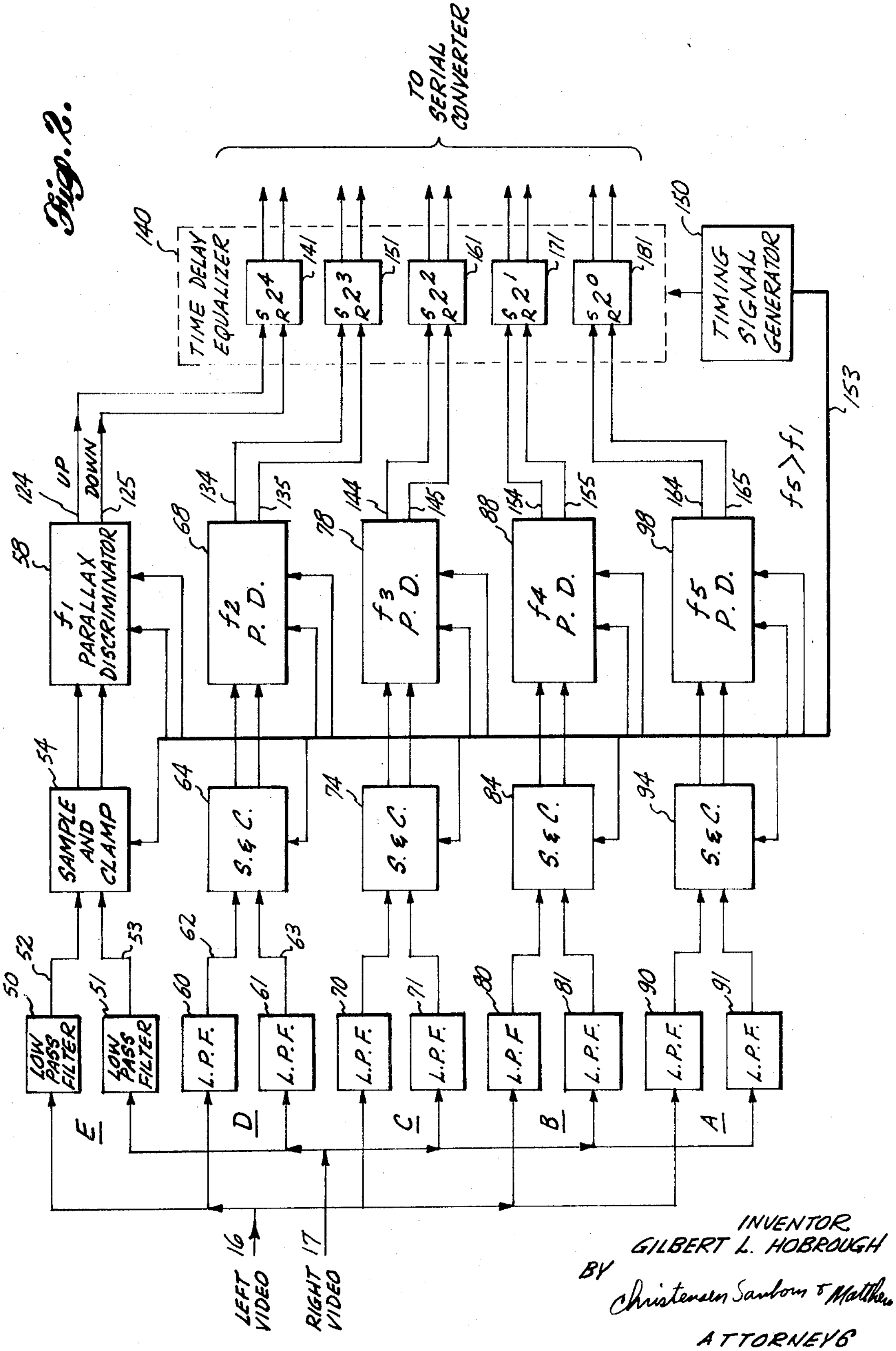
FIG. 2 is a block diagram of the frequency band-selection and video-to-digital converter circuits in the system of FIG. 1 together with the individual parallax discriminator circuits which provide "up" or "down" signals for the formation of a multi-bit binary signal representation of the parallax.
Figure 3:
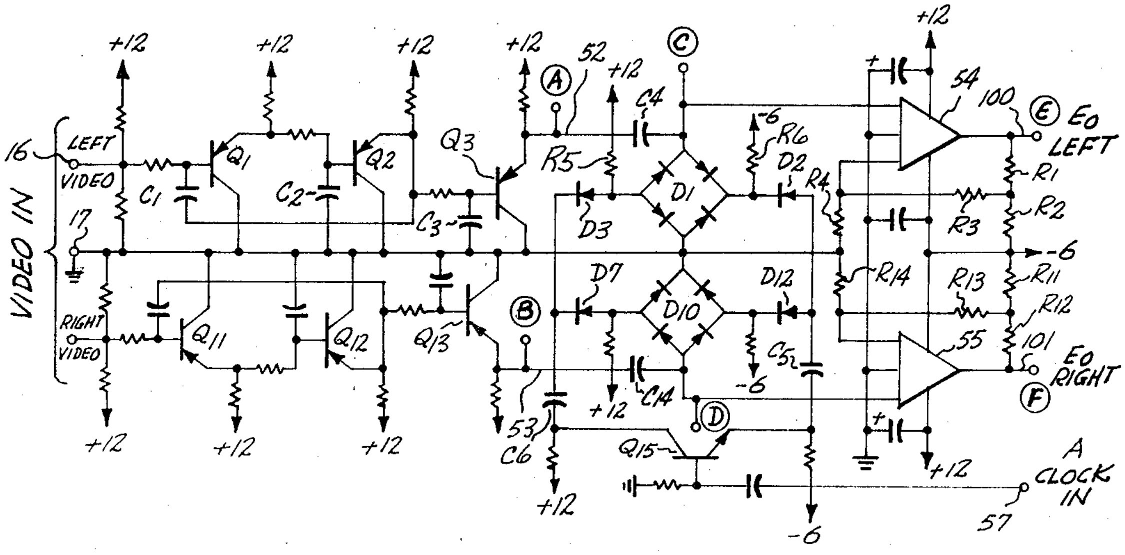
FIG. 3 is a circuit diagram of one preferred embodiment of the frequency selection and video-to-digital converter circuitry.

Turning now to FIG. 2 a more detailed illustration is provided for a system wherein left and right video signals on the input terminals 16 and 17 are effectively divided into five frequency bands having center frequencies $f_1$ through $f_5$, $f_5$ being the highest frequency and $f_1$ the lowest frequency. For purpose of illustration the entire video spectrum is illustrated as being covered by the channels A, B, C, D, and E with each channel operating over approximately one octave of the spectrum. It will be seen that the left video signals on input circuit 16 are simultaneously applied to the low pass filters 50, 60, 70, 80 and 90 while the right video signals are applied to the low pass filters 51, 61, 71, 81 and 91. The details of the low pass filter circuits 50 and 51 are illustrated in FIG. 3 wherein it will be seen that transistors $Q_1$, $Q_2$ and $Q_3$ together with the indicated passive components constitute the low pass filter 50. In an identical manner the transistors $Q_{11}$, $Q_{12}$ and $Q_{13}$ and their indicated passive circuit elements constitute the low pass filter 51. Similar sets of circuits are utilized for the other pairs of active low pass filters, or if desired passive low pass filters could be used.

As seen in FIG. 2 the output circuits 52 and 53 from low pass filters 50 and 51 are applied to the sample and clamp circuits indicated generally at 54. As seen in FIG. 3 the sample and clamp circuit associated with low pass filter 50 includes the capacitor $C_4$ connected between the emitter of transistor $Q_3$ and the amplifier 54 having its output circuit 100 connected to a −6 volt supply by the resistors $R_1$ and $R_2$. Resistor $R_3$ connected from the junction of resistors $R_1$ and $R_2$ to the amplifier input and to ground via resistor $R_4$ provides feedback from the output of the amplifier to the input thereof. Thus a comparator circuit is provided with the resistance of the feedback resistor $R_3$ being much higher than the resistance of resistor $R_4$. It will be seen that a certain amount of hysteresis is thus provided which eliminates erratic response to noise when the video signal falls to a low level. This also avoids a change in state of the output circuit 100 during the clamping periods.

A diode clamping circuit $D_1$ is connected between the capacitor $C_4$ and signal ground, and to the positive and negative power supply terminals via resistors $R_5$ and $R_6$. The clamping action of the diode bridge circuit is controlled by the transistor $Q_{15}$ having its emitter connected via capacitor $C_5$ and diode $D_2$ and its collector via capacitor $C_6$ and diode $D_3$ to the diode bridge. The base of the transistor $Q_{15}$ is connected to the "A" clock pulse terminal 57. As seen from the "A," "-clock," and "C" waveforms of FIG. 5, the clock pulses applied to transistor $Q_{15}$ cause periodic interruption of the clamping action of the diode bridge on capacitor $C_4$. Thus capacitor $C_4$ together with resistor $R_5$ or resistor $R_6$ serves to periodically differentiate the output signal from transistor $Q_3$ and thus provide the comparator circuit with an input signal indicative of the direction of change of the "A" input signal during the sampling interval.

Figure 5:
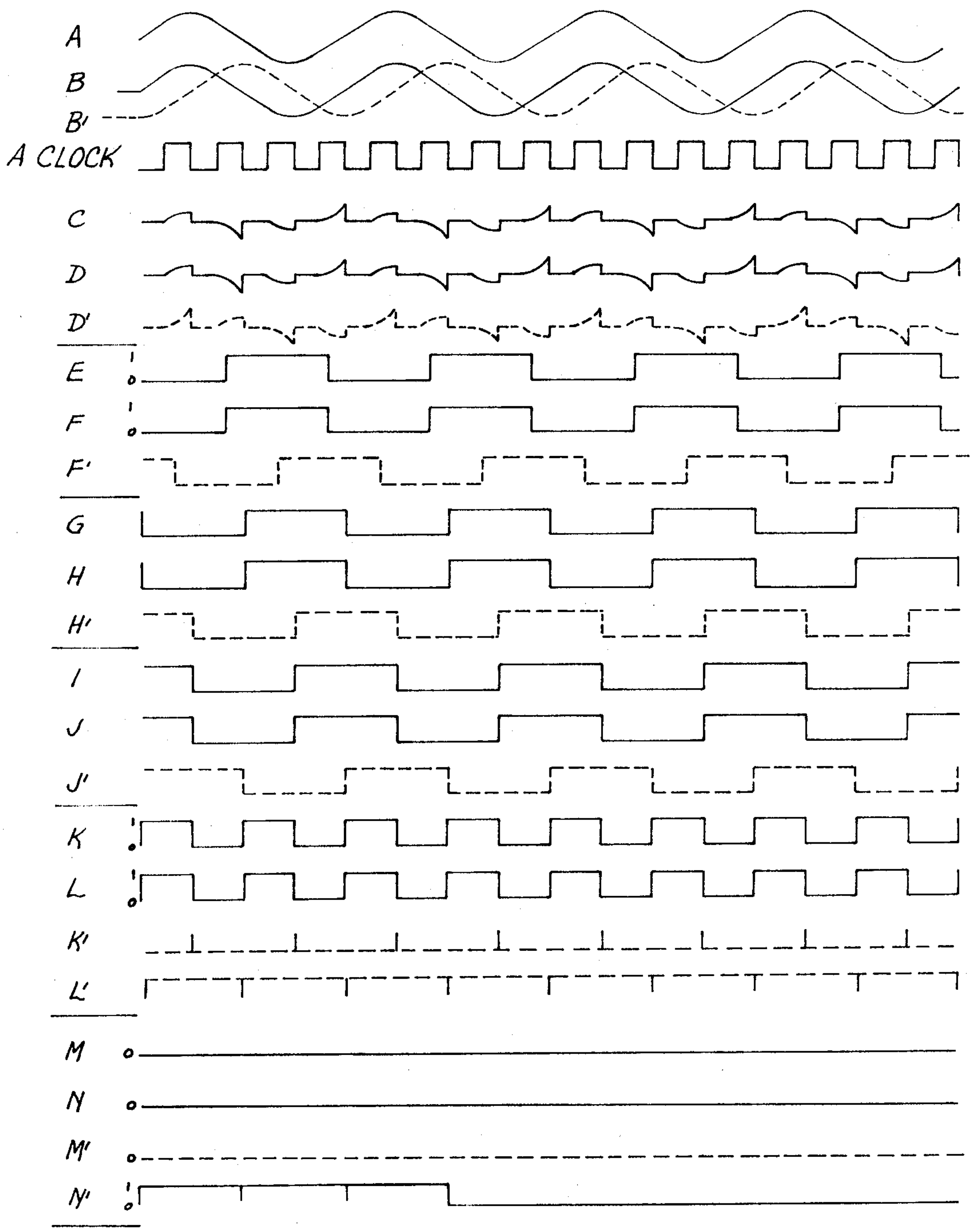
FIG. 5 is a waveform diagram showing typical signal conditions at the points shown by block letters in FIGS. 3 and 4.

As seen from the output signal "E" (FIG. 5) from comparator 54, the signals from capacitor $C_4$ serve to control the output level of the comparator in a manner such that the output signal "E" is of one value or another and hence a digital representation of the phase of the input video signal is obtained. In one system the sampling frequency was selected to be approximately four times the frequency of the video frequency and thus the video signal is sampled every 90° (FIG. 5).

As seen in FIG. 3 a second video-to-digital conversion circuit is provided by the capacitor $C_{14}$, diode bridge $D_{10}$, amplifier 55, resistors $R_{10}$–$R_{16}$ together with the control transistor $Q_{15}$ connected to the diode bridge $D_{10}$ via capacitor $C_5$, diode $D_{12}$, capacitor $C_6$, and diode $D_7$. As seen in FIG. 5 the "F" output signal from the amplifier 55 is in phase with the output signal from amplifier 54 so long as the left and right video signals "A" and "B" are in phase. For purpose of illustration the waveform "B′" is shown in dashed lines to represent the right-hand video signal as being 90° out of phase with respect to the left-hand signal. The other dashed-line waveforms of FIG. 5 labeled by "primed" alpha designations represent the signal conditions at the indicated points in the circuits of FIGS. 3 and 4 when this 90° out of phase condition exists.

Figure 4:
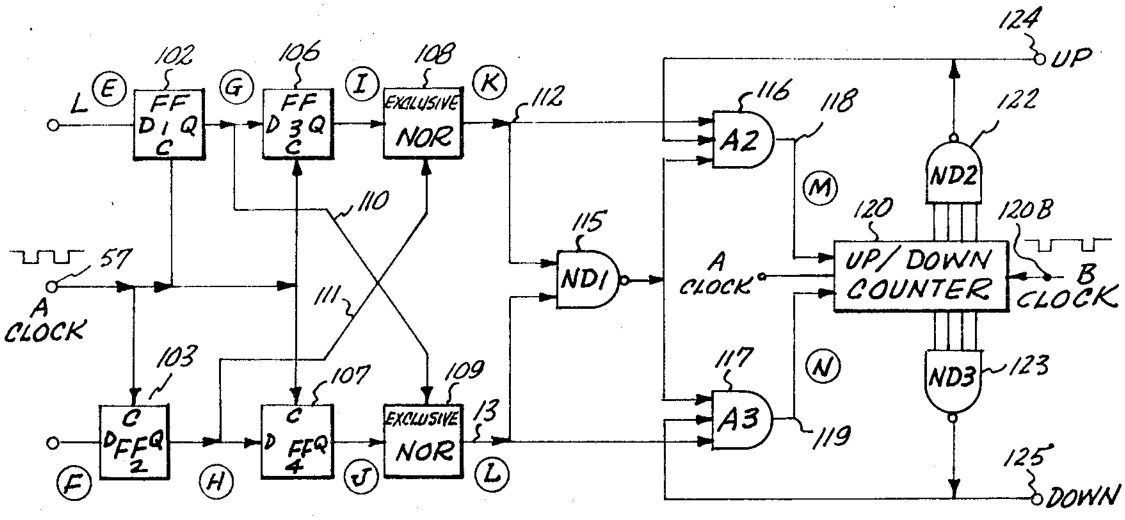
FIG. 4 is a block diagram of a preferred embodiment of a digital parallax discriminator circuit having an up/down counter in the output portion thereof.

Since the video-to-digital converter circuits of FIG. 3 provide binary output signals it will be seen that the parallax discriminator 58 can make use of digital circuitry for performing the parallax discrimination function. The details of the parallax discriminator 58 are shown in FIG. 4 wherein the output circuits 100 and 101 from the video-to-digital converter circuits of FIG. 3 serve as the input circuits for the synchronizing flip-flops 102 and 103. The clock pulse terminal 57 of FIG. 3 will be seen to be connected to the synchronizing flip-flops 102 and 103 of FIG. 4 so that these flip-flop circuits receive clock pulse signals at a frequency of approximately four times the center frequency of the particular channel of the video input signals. As seen in FIG. 5, the particular circuits shown are triggered by the trailing edge of the clock pulse signals. The delay flip-flops 106 and 107 connected to the synchronizing flip-flops 102 and 103 introduce a delay of one clock pulse into the left and right input signals and thus in the particular system illustrated the one clock pulse delay corresponds to a 90° delay of the video input signal.

Flip-flops 106 and 107 are respectively coupled with the exclusive NOR gates 108 and 109. Circuits 110 and 111 also respectively couple the flip-flops 102 and 103 to the exclusive NOR gates 109 and 108. These gates thus multiply delayed and undelayed signals from the left and right channels symmetrically and provide product signals on their output circuits 112 and 113. Circuit 112 is connected as one of the input circuits for the NAND gate 115 as well as to the AND gate 116. In a similar manner circuit 113 is connected as the second input circuit for the NAND gate 115 and as one of the input circuits for the three level AND gate 117. These gates 115, 116, and 117 ensure that the input signals on lines 118 and 119 to the up/down counter 120 are not in the "up" and "-down" state simultaneously. The up/down counter 120 is a multiple stage binary counter which is under the control of the "A" clock pulses for counting. The "B" clock pulse signals applied to the control terminal 120B at a rate corresponding to 16 clock time periods of the A clock pulses control resetting of the counter. Thus it will be seen that the up/down counter can count as many as 16 pulses between reset pulses.

NAND gates 122 and 123 coupled with the up/down counter serve to control the up and down count output circuits 124 and 125. It will be seen that the circuits 124 and 125 are respectively coupled as one of the input circuits to the AND gates 116 and 117 and serve to disable the input AND gates 116 and 117 when the counter has achieved a selected count. Thus the up state or the down state of the output circuit is maintained until the end of a reset period once the counter has up-counted or down-counted to a predetermined value as determined by the coding of the NAND gates 122 and 123. In one specific system it was found that setting the NAND gates 122 and 123 for providing an up or a down count output signal whenever the counter 120 achieved an up count of six or a down count of six provided an arrangement which worked satisfactorily. The up/down counter serves as an averager by counting in one direction if the left image is leading in time (on the specific illustrated system) and in the other direction (i.e., "down") if the right image is leading in time.

The above described sample and clamp circuit of FIG. 3 and the parallax discriminator circuit of FIG. 4 is repeated in parallel fashion in the manner illustrated in FIG. 2. Thus the sample and clamp circuits 54, 64, 74, 84 and 94 would each correspond to those shown in FIG. 3, and the parallax discriminator circuits 58, 68, 78, 88 and 98 would correspond to the circuitry of FIG. 4. The output circuits 124 and 125, 134 and 135, 144 and 145, 154 and 155, and 164 and 165 serve as the input circuits for the time delay equalizer 140 having flip-flops 141, 151, 161, 171 and 181 therein. It is of importance to note that the sample and clamp circuit and the parallel discriminator circuits 54 and 58 associated with the lowest frequency channel determines the setting of the flip-flop 141 which is shown as corresponding to the highest position in the five bit binary number representing the total parallax error between the right and left video input signals. Thus there is effectively a nonlinear weighting of the composite output signal representing the parallax error. That is, due to the binary system of establishing the parallax error signal it will be seen that the parallax error signal is composed of a plurality of binary weighted step function signals which are frequency dependent. Thus the lower frequency portions of the video input signals have the dominant effect on the parallax correction circuitry. In one system the time delay equalizer utilized a shift register for each channel other than the lowest frequency channel in order to obtain the desired delay. Since the lowest frequency channel controls the reset it will be seen that no delay is required for it.

A correction word that is the weighted algebraic sum of all of the ups and downs at a given instant is obtained by applying the five "up" signals to the parallel-to-serial converter to obtain a serial word having the lowest frequency channel supplying the most significant bit and the highest frequency channel supplying the least significant bit, and similarly using the "-down" to obtain a second serial word. These serial words are delivered from the parallel serial converter at the clock rate of the least significant bit. Thus while the least significant bit may change in each word the bits from the lower frequency channels can only change as governed by the minimum length of the correction pulse generated by clock pulse generator. In order to achieve a composite correction requirement the serial "down" words are subtracted from the serial "up" words and the result shifted into the lateral integrator 23.

Figures 6, 7, 8, 9:
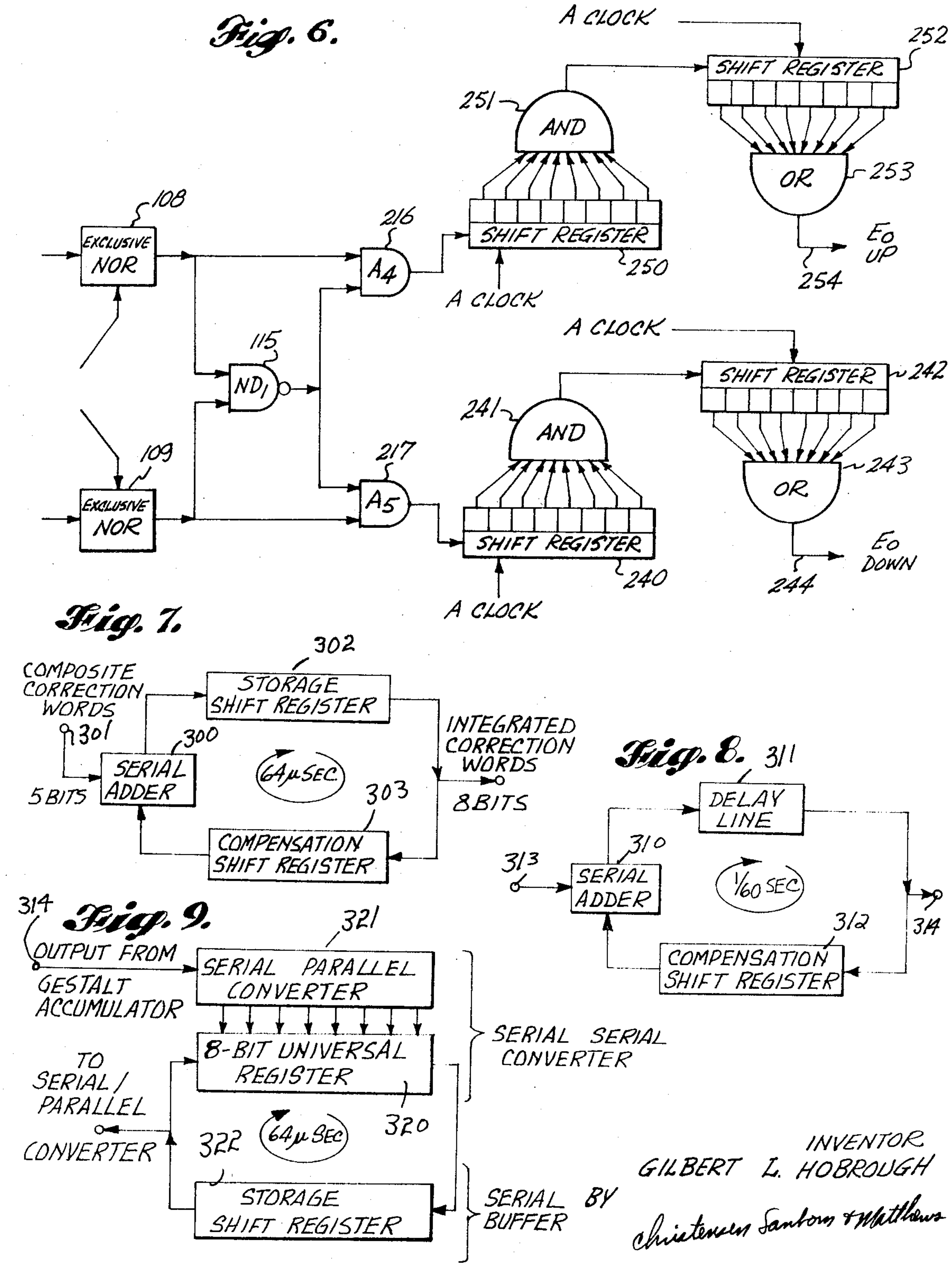
FIG. 6 is a block diagram of another embodiment of an output circuit for the parallax discriminator of FIG. 4 and including a pair of shift registers and gating circuits.
FIG. 7 is a block diagram of the lateral integrator shown in the system of FIG. 1.
FIG. 8 is a block diagram of the Gestalt accumulator shown in the system of FIG. 1.
FIG. 9 is a block diagram of the system for processing output signals from the Gestalt accumulator of FIG. 8 and including a serial/serial converter together with a serial buffer.

The lateral integrator 23 is a high speed circulating memory with an arithmetic serial adder as an input device. Consequently, it functions as an integrator. FIG. 7 depicts one embodiment of the lateral integrator as including a serial adder 300 which applies the composite correction word at input 301 to whatever is already in memory, and a circulating storage shift register having a period equal to the line rate of the scanning system. Included in this loop is the storage shift register 302 and the compensation shift register 303. Also included in the loop but not shown are overflow inhibitors to prevent integration from exceeding an eight bit word when continued parallax is encountered.

To best understand the operation of the lateral integrator one can consider the system operation as seen from FIG. 1. After one line of the images is scanned by the vidicons the parallax detection and correction generation systems supply the correction data to the lateral integrator for that line. With proper delays and attenuation the corrections are applied to the X-deflection system during the scanning of the next adjacent line by way of the digital to analog converter and the deflection amplifiers. The scanning of the next adjacent line provides further correction requirements that reach the input of the lateral integrator at the same time as the previous line of corrections that have been circulated around the lateral integrator loop. Thus, the correction requirements of the second line (either additive or subtractive) are added to the existing corrections in the lateral integrator loop. This process continues providing a fast correction capability in a line by line fashion. The output of the lateral integrator is also transferred to the Gestalt accumulator.

The Gestalt accumulator 24 is constructed similarly to the lateral integrator 23. FIG. 8 shows one such accumulator. The Gestalt accumulator is designed to store one-eighth of the correction words generated by the lateral integrator. Corrections are stored by small areas rather than by line segments as in the lateral integrator. Consequently, the parallel serial conversion into the Gestalt accumulator operates to extract each eighth word from each line of words from the lateral integrator while advancing one word for each line advanced. In the embodiment shown in FIG. 8 the Gestalt accumulator operates in serial mode at 1/60-second cycle time and includes a serial adder 310, a delay line 311, a compensation shift register 312, with input and output terminals 313 and 314.

In FIG. 9 the circuit is shown for processing data from the Gestalt accumulator, which has a cycle time of one-sixtieth second, in order to obtain output data for a 64 micro second correction channel at the parallel adder. A word from the Gestalt accumulator enters a universal register 320 by parallel entry from a serial parallel converter 321. The word immediately is circulated through a serial loop that includes the universal register 320 and a storage shift register 322. This word remains in the loop for eight cycles. Consequently, the input word is shifted out of the universal register in serial from eight times before a new word is entered. The storage shift register 302 times the extraction cycle and the output of words is at a rate commensurate with the data flow from the lateral integrator. After serial/parallel conversion the words are added to the words output from the lateral integrator and the sums are converted to analog voltages for use in the scanning deflection system.

As described above the frequency at which the various bands of the video signals are sampled is determined by the frequency of the band with the clock pulse signals being adjusted accordingly. The timing signal generator can be any of a number well known in the art and thus is shown diagrammatically in FIG. 2 as the signal generator 150. Lead 153 represents a plurality of timing signal lines for applying signals to each of the parallax discriminator circuits and the sample and clamp circuits.

While the details of the specific circuitry will vary in accordance with a particular system, in one system the timing and clock parameters were established in accordance with the line rate for U.S. television (i.e., 15.75 kHz.). This corresponds to a line period of 63.5 microseconds. In one system the basic clock rate for the highest frequency channel (i.e., the A channel in FIG. 2) was therefore 16.128 MHz, and the other channel frequencies were as shown in the following chart. The following chart also shows the value for the capacitors $C_1$, $C_2$, $C_3$ and $C_4$ in the sample and clamp circuitry of FIG. 3:

| Channel | Approx. Center $f$ MHz. | A Clock MHz. | B Clock MHz. | $C_1$ & $C_2$ $P_f$ | $C_3$ $P_f$ | $C_4$ $P_f$ |
|---|---|---|---|---|---|---|
| A | 4 | 16.128 | 1.008 | 20 | 30 | 47 |
| B | 2 | 8.064 | 0.504 | 40 | 60 | 100 |
| C | 1 | 4.032 | 0.252 | 80 | 120 | 180 |
| D | 0.5 | 2.016 | 0.126 | 160 | 240 | 390 |
| E | 0.25 | 1.008 | 0.063 | 330 | 490 | 820 |

Resistors $R_1$, $R_2$, $R_3$, and $R_4$ were 220 ohms, 3,000 ohms, 6,000 ohms, and 100 ohms, respectively.

FIG. 6 is a block diagram of another embodiment of a preferred signal output portion of the parallax discriminator circuit. The gates 108 and 109 as well as the circuitry preceding them correspond to the gates identified by the same reference numbers in FIG. 4. However in the arrangement of FIG. 6 the two level AND gates 216 and 217 are connected to the gates 108, 109, and 115. "Down" counting signals from gate 217 are applied to the eight bit shift register 240 which has each of its stages connected to the AND gate 241 so that an output signal is provided from gate 241 only after eight "-down" counting signals in a continuous sequence have been applied to the shift register 240. The output circuit of gate 241 is connected to the second eight bit shift register 242 which has each of its stages connected to the OR gate 243. Thus once eight down counting signals in a row have been applied to shift register 240, a down count signal will remain on output circuit 244 for eight clock pulse time intervals.

The shift registers 250 and 252 together with the gates 251 and 253 operate in a similar manner on the up counting signals from gate 216 to provide an "up" correction signal on output circuit 254.

While the invention has been disclosed by reference to the present preferred embodiment, it will be recognized that various changes can be made without departing from the inventive concepts. For example the sampling rate in the specific embodiment shown was four per cycle of the video signal being processed and a delay of 90° was provided by the single set of delay flip-flops 106 and 107. In another system using the same generic concepts disclosed herein the clock pulse rate was eight times the center frequency of the video signal being processed and thus the video signal was sampled every 45°. In that system an additional set of delay flip-flops were used, one each being connected in series circuit between the flip-flops 106 and 107 and the gates 108 and 109. Thus the delay introduced by each flip-flop corresponds to a 45° delay, with the left and right undelayed signals being cross multiplied with signals which were delayed 90°.

It has been found that using the techniques disclosed herein the circuitry can be assembled using many logic circuit components which are readily available on the market. This results in ready interfacing to additional digit circuit components and obtains the advantages and reliability of digital logic circuits. Analog delay lines can thus be eliminated in the remainder of the overall system as disclosed in the above referred to copending application and also the need for high pass filters for each channel and the associated time domain smearing are eliminated.

What is claimed is:

1. A parallax discriminator system comprising in combination: frequency selection and signal sampling circuit means having first and second signal input circuits for receiving first and second video signals and operative to provide a plurality of pairs of output signals, each of said pairs of signals including one signal responsive to a selected frequency band of the first video signal and one signal responsive to the same frequency band of the second video signal; a plurality of digital parallax discriminator circuits connected in parallel circuit arrangement with each other, each said discriminator circuit being connected to said selection circuit means to receive a different pair of said output signals, each of said discriminator circuits providing output signals representing the phase relationship between the two input signals applied thereto; and signal delay circuit means including a plurality of binary weighted time delay circuit means each coupled with one of said discriminator circuits, the highest and lowest orders of the delay circuit means being respectively connected to the parallax circuits which receive signals corresponding to the lowest and highest frequency bands selected and sampled by said selection and sampling circuit means.

2. A system as defined in claim 1 wherein said selection and sampling circuit means includes a plurality of signal sampling circuits each of which has first and second two-level signal output circuits and each of which includes means for periodically sampling the first and second input signals and setting the levels of its output circuits in accordance with the slope of the signal wave forms of the selected band of the first and second input signals at the time of sampling, the output level of each said two-level output circuit being set to one level when the associated input signal wave form is increasing in amplitude and to the other level when the signal wave form is decreasing in amplitude at the time of sampling.

3. The system defined in claim 1 wherein each of said discriminator circuits includes signal delay means for storing for a predetermined time the signals received from said selection and sampling circuit means, and circuit means operative to cross-multiply delayed and undelayed signals from each pair of signals received from said selection circuit means.

4. The system of claim 3 wherein said signal delay means of said discriminator circuits includes first and second bistable circuits connected to receive a different one of the pair of output signals from said selection and sampling circuit means.

5. The system defined in claim 3 wherein said circuit means operative to cross-multiply signals includes first and second two-level signal gating circuits each having input circuits connected to receive a delayed and an undelayed signal corresponding respectively to the first and second signals from the selection circuit means.

6. The system of claim 5 wherein said gating circuits are exclusive NOR gates.

7. The system of claim 2 including a plurality of bidirectional counters, each of which is connected between one of said discriminator circuits and the associated signal delay circuit means, said bi-directional counters being operative to count up when one of the two sampled signals leads the other and to count down when said one sampled signal lags the other.

8. A parallax discriminator circuit comprising in combination: first and second bistable circuits adapted to receive first and second input signals, respectively; third and fourth bistable circuits respectively connected in series circuit with said first and second bistable circuits; a first signal gate circuit having a first input circuit connected to said third bistable circuit and a second input circuit connected to said second bistable circuit; a second signal gate circuit having a first input circuit connected to said fourth bistable circuit and a second input circuit connected to said first bistable circuit; clock pulse signal input means coupled with each of said bistable circuits; and signal output means coupled with said signal gate circuits and providing a first output signal when only said first gate circuit provides an output signal and a second output signal when only said second gate circuit provides an output signal.

9. A discriminator circuit as defined in claim 8 including a counter coupled with said output circuit and operative to count up in response to each said first signal and down in response to each said second signal.

10. A discriminator circuit as defined in claim 8 including first shift register means connected to said signal output means and to said clock pulse signal input means; second shift register means coupled with said clock pulse signal input means; means connecting selected stages of said first shift register means with the input of said second shift register means and operative to provide said second shift register means with an input signal only when a plurality of said selected stages is in a first condition; and correction signal output means connected to said second shift register means for providing a correction signal when any stage in said second register means is in a first condition.

11. The apparatus of claim 10 wherein said first shift register means is responsive only to said first output signals, and further including a third shift register means connected to said signal output means and responsive only to said second output signals; fourth shift register means; means connected between said third and fourth shift register means providing an input signal to said fourth shift register means only when selected stages of said third shift register means is in a first condition; and second correction signal output means connected to said fourth shift register and providing an output signal when any stage of said fourth shift register means is in a first condition.

* * * * *